United States Patent
Kim (10) Patent No.: US 10,629,210 B2
(45) Date of Patent: Apr. 21, 2020

(54) VOICE RECOGNITION APPARATUS, VEHICLE HAVING THE SAME, AND CONTROL METHOD OF VOICE RECOGNITION APPARATUS

(71) Applicants: Hyundai Motor Company, Seoul (KR); Kia Motors Corporation, Seoul (KR)

(72) Inventor: BiHo Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 15/630,076

(22) Filed: Jun. 22, 2017

(65) Prior Publication Data

US 2018/0197546 A1 Jul. 12, 2018

(30) Foreign Application Priority Data

Jan. 9, 2017 (KR) .................. 10-2017-0002863

(51) Int. Cl.
*G10L 15/22* (2006.01)
*G10L 17/06* (2013.01)
(Continued)

(52) U.S. Cl.
CPC .......... *G10L 17/06* (2013.01); *B60R 16/0373* (2013.01); *G10L 15/222* (2013.01); *G10L 17/02* (2013.01); *G10L 17/20* (2013.01)

(58) Field of Classification Search
CPC ....... G10L 21/04; G10L 13/00; G10L 15/005; G10L 15/22; G10L 15/265; G10L 19/00; G10L 2013/105; G10L 21/00; G10L 21/043; G10L 21/057; G10L 17/06; G10L 15/222; G10L 17/02; G10L 17/20; G06F 3/165; G06F 3/0482; G06F 19/3481; G06F 3/04847; G06F 11/1471; G06F 17/30368; G06F 17/30017; G06F 17/30873; G06F 3/017; G06F 3/0304; G06F 3/04842; G06F 3/0487; G06F 3/0488; G06F 3/167; B60R 16/0373
See application file for complete search history.

(56) References Cited

U.S. PATENT DOCUMENTS 6,285,952 B1 * 9/2001 Kim .................. G01C 21/3629
340/990
7,525,575 B2 * 4/2009 Rees ..................... G03B 17/00
348/211.4

(Continued)

FOREIGN PATENT DOCUMENTS

JP 2014-199323 A 10/2014
KR 10-0902477 B1 6/2009
(Continued)

*Primary Examiner* — Abdelali Serrou
(74) *Attorney, Agent, or Firm* — Morgan, Lewis & Bockius LLP (57) ABSTRACT

A voice recognition apparatus may include a receiver configured to receive a voice command; a provider configured to output a guidance message; and a controller configured to control the provider in response to the voice command, analyze a listening pattern of the guidance message transmitted by the receiver, and adjust an output of the guidance message based on the listening pattern.

15 Claims, 10 Drawing Sheets

(51) Int. Cl.
  *B60R 16/037* (2006.01)
  *G10L 17/20* (2013.01)
  *G10L 17/02* (2013.01)

(56) References Cited

U.S. PATENT DOCUMENTS

| | | | | |
|---|---|---|---|---|
| 7,672,840 | B2 * | 3/2010 | Sasaki | G10L 21/04 |
| | | | | 704/215 |
| 8,150,020 | B1 * | 4/2012 | Blanchard | G10L 15/22 |
| | | | | 379/265.03 |
| 9,575,563 | B1 * | 2/2017 | Li | G06F 3/017 |
| 9,832,581 | B1 * | 11/2017 | Yang | H04R 29/001 |
| 10,455,347 | B2 * | 10/2019 | Reilly | H04R 29/008 |
| 2002/0004722 | A1 * | 1/2002 | Inoue | G10L 21/04 |
| | | | | 704/500 |
| 2004/0243418 | A1 * | 12/2004 | Wen | G09B 5/04 |
| | | | | 704/277 |
| 2004/0249650 | A1 * | 12/2004 | Freedman | G06Q 30/02 |
| | | | | 705/7.29 |
| 2007/0115345 | A1 * | 5/2007 | Koh | H04N 5/76 |
| | | | | 348/14.02 |
| 2009/0248419 | A1 * | 10/2009 | Spaulding | G10L 15/22 |
| | | | | 704/275 |
| 2010/0033427 | A1 * | 2/2010 | Marks | H04N 13/10 |
| | | | | 345/156 |
| 2011/0125503 | A1 * | 5/2011 | Dong | G10L 15/22 |
| | | | | 704/275 |
| 2011/0206198 | A1 * | 8/2011 | Freedman | G06Q 30/06 |
| | | | | 379/265.03 |
| 2011/0276329 | A1 * | 11/2011 | Ayabe | G10L 15/22 |
| | | | | 704/243 |
| 2014/0074482 | A1 * | 3/2014 | Ohno | G10L 13/04 |
| | | | | 704/275 |
| 2014/0281976 | A1 * | 9/2014 | Chia | H04N 5/783 |
| | | | | 715/716 |
| 2015/0243294 | A1 * | 8/2015 | Kitatani | G09B 5/04 |
| | | | | 704/270 |
| 2015/0371660 | A1 * | 12/2015 | Tsunoda | G10L 21/049 |
| | | | | 704/206 |
| 2016/0180846 | A1 * | 6/2016 | Lee | G10L 15/22 |
| | | | | 704/251 |
| 2016/0316306 | A1 * | 10/2016 | Nooralahiyan | G06F 3/162 |
| 2017/0060529 | A1 * | 3/2017 | Thirumale | G01C 21/3629 |
| 2017/0076581 | A1 * | 3/2017 | Felch | G08B 21/245 |
| 2017/0242651 | A1 * | 8/2017 | Lang | H04R 29/007 |
| 2019/0005959 | A1 * | 1/2019 | Cameron | G06F 3/165 |

FOREIGN PATENT DOCUMENTS

| | | |
|---|---|---|
| KR | 10-1558656 B1 | 10/2015 |
| KR | 10-2016-0027728 A | 3/2016 |

* cited by examiner

VOICE RECOGNITION APPARATUS, VEHICLE HAVING THE SAME, AND CONTROL METHOD OF VOICE RECOGNITION APPARATUS

CROSS-REFERENCE(S) TO RELATED APPLICATIONS

The present application claims priority to Korean Patent Application No. 10-2017-0002863 filed on Jan. 9, 2017, the entire contents of which is incorporated herein for all purposes by this reference.

BACKGROUND OF THE INVENTION

Field of the Invention

The present invention relates to a technique for recognizing a voice command of a user and providing a convenient service to a user.

Description of Related Art

Since the introduction of digital devices, there have been various developments of interfaces for manipulating digital devices. In recent years, flat panel displays and capacitive touch detectors have been widely used as representative detectors for manipulating various personal smart devices, such as smart phones and tablet PCs.

The touch detector has benefits to allow for intuitive operation and receive immediate command feedback. However, when complicated interactions are required, such as when two hands are not free, complicated commands need to be performed, commands are executed in a number of stages of interaction, or a long text are entered, the usability of the touch detector is degraded.

The voice recognition detector is a natural and intuitive interface that may compensate for the limitations of the touch detector. As a result, the voice recognition detectors are increasingly being used in fields including a vehicle device control and a voice secretary for smart device.

A voice recognition apparatus, including the voice recognition detector, recognizes a user's voice and enhances an interaction through various operations related to the user's voice. For example, the voice recognition apparatus recognizes a driver's voice in a vehicle, and outputs a guidance operation or guidance message related to the recognized voice.

Such a guidance message is generated based on a scenario stored in the voice recognition apparatus. At the present time, with repeated use of the guidance message, a user is fully aware of the guidance message, may not listen to the contents or hear only a front part of the guidance message.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a voice recognition apparatus, a vehicle having the same, and a control method of a voice recognition apparatus which allows a user to use a voice recognition apparatus conveniently by modifying a guidance message according to a usage pattern of the user so that a new guidance message having a more suitable length is provided, and enhance an interaction between the user and apparatus by providing an output based on a user's behavior.

In accordance with one aspect of the present invention, the above and other objects can be accomplished by the provision a voice recognition apparatus including a receiver, a provider, and a controller.

In various exemplary embodiments, a voice recognition apparatus includes: a receiver configured to receive a voice command; a provider configured to output a guidance message; and a controller configured to control the provider in response to the voice command, analyze a listening pattern of the guidance message transmitted by the receiver, and adjust an output of the guidance message based on the listening pattern. The listening pattern includes an average of listening times for the guidance message, and the listening time includes a time period from when the outputting of the guidance message is started to when the outputting of the guidance message is stopped by a user's input.

In various exemplary embodiments, the voice recognition apparatus the controller adjusts the output of the guidance message by comparing the listening time with a predetermined time, wherein when the listening time is equal to or longer than the predetermined time, the controller outputs a shortened guidance message shorter than the guidance message.

The controller adjusts an output speed of the shortened guidance message by comparing the shortened guidance message with the listen time, the controller controls the provider to output a beep sound without outputting the guidance message. In further embodiments, when the controller receives a new voice command from a user while the guidance message is being output, the controller stops outputting the guidance message.

The voice recognition apparatus according to an exemplary embodiment of the present invention is provided to cure the disadvantages of the prior are while having the advantage of being receptive and dynamic to a user input frequency and time.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Not all elements of embodiments of the present invention will be described, and description of what are commonly known in the art or what overlap each other in the exemplary embodiments will be omitted. The terms as used throughout the specification, such as "~ part", "~ module", "~ member", "~ block", etc., may be implemented in software and or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Reference numerals used for method steps are only used for convenience of explanation, but not to limit an order of the steps. Thus, unless the context clearly dictates otherwise, the written order may be practiced otherwise.

Figure 1:
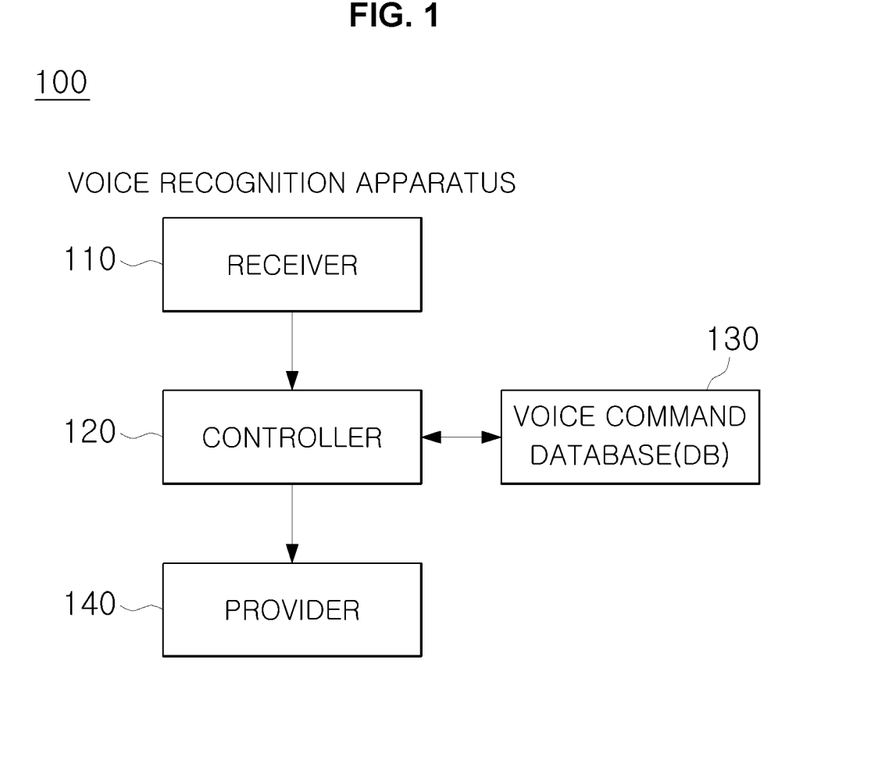
FIG. 1 and FIG. 2 are block diagrams illustrating a voice recognition apparatus according to an exemplary embodiment of the present invention.
Figure 2:
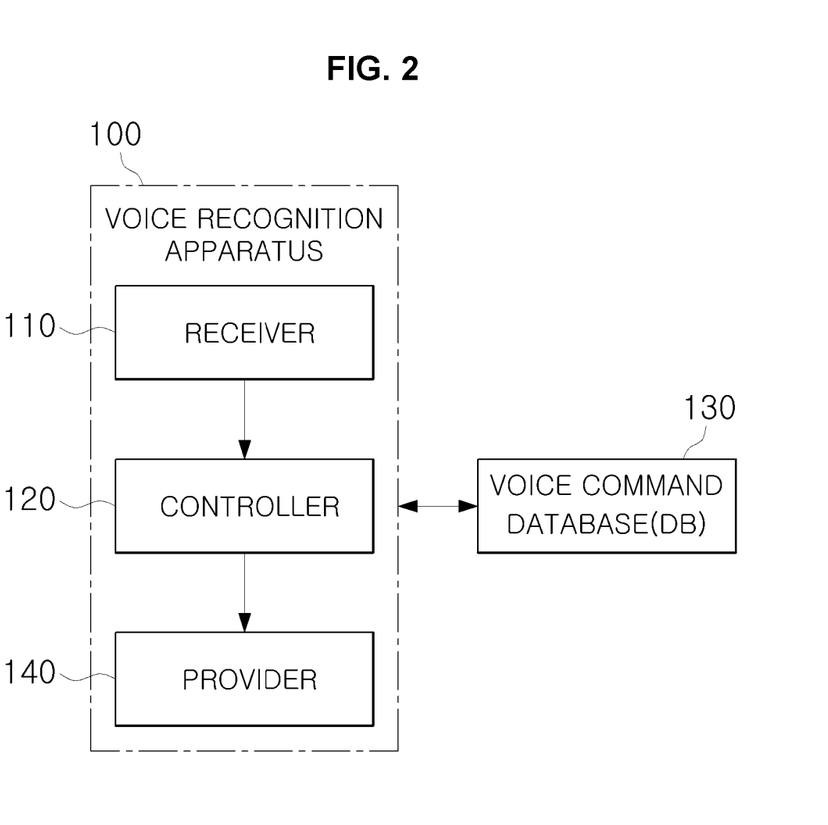

FIG. 1 and FIG. 2 are block diagrams illustrating a voice recognition apparatus according to an exemplary embodiment of the present invention.

A voice recognition apparatus 100 described below refers to an apparatus that provides a voice recognition service through a voice recognition engine. The voice recognition apparatus 100 may be embedded in a portable terminal including a smart phone and a PDA, a wearable device detachable to a user's body, a smart TV including a voice command system, or a vehicle. The voice recognition service described below refers to a service that helps a user to be serviced as desired by use of a voice command of the user which is received through a voice recognition sensor.

Referring to FIG. 1, the voice recognition apparatus 100 may include a receiver 110, a controller 120, a voice command database 130, and a provider 140. In various exemplary embodiments, the receiver 110, the controller 120, the voice command database 130, and the provider 140 are integrated into a system on a chip incorporated in the voice recognition apparatus 100.

In various exemplary embodiments, the receiver 110 may receive a touch input of a user which is detected on a screen through a touch detector. The touch detector described below refers to a detector configured for detecting a touch input of a user occurring on a screen of a voice recognition apparatus 100. That is, the receiver 110 may receive at least one of a user's voice command and a touch input.

The controller 120, according to an exemplary embodiment of the present invention, refers to a module that is configured to control the overall operation of the voice recognition apparatus 100. The controller 120 is configured to analyze a listening pattern for a guidance message based on the voice recognition received by the receiver 110. Thereafter, the controller 120 adjusts an output of the guidance message based on the result of the analyzed listening pattern.

The controller 120 is configured to extract a keyword from a voice command of a user by use of the voice command database 130. In detail, the controller 120 may extract keywords from the voice command of the user by searching the voice command database 130 using the voice recognition engine.

The controller 120 is configured to control the provider 140 to output a guidance message according to the extracted keyword. The guidance message is included in the guidance voice recognition service according to a scenario related to the recognized keyword.

The keyword may refer to a part or all of the words included in the voice command. According to one embodiment, the keyword includes a word related to a service desired to be received by a user among the words included in the voice command of the user. The keyword is not limited to one embodiment, and some or all of the words included in the voice command of the user may be selected as keywords through various methods. In various exemplary embodiments, the service described below may refer to all application services including an application, that may be executed through a processor of the voice recognition apparatus 100.

For example, after the controller 120 outputs a guidance message saying "Say your command", when the user inputs a voice command "Connect phone", the keyword may be "phone". The controller 120 extracts the "phone" keyword from the voice command of the user by use of the voice command database 130, and executes a guidance service related to "phone".

The controller 120 is configured to analyze a listening pattern of the user. In the above-mentioned example, the user may listen to only "Say your" in the guidance message and say "Connect the phone" before the completion of the guidance message. The controller 120 may analyze the listening pattern of the user and adjust the guidance message to be output with a shortened length. A detailed description thereof will be given later with reference to the drawings.

The voice command database 130 is configured to store a listening pattern of the user, a history of use of the voice recognition service, and a scenario based on the keyword.

The user's listening pattern refers to an average time the user hears the guidance message. The history of use of the voice recognition service refers to information related to a service which has been executed including the type of the voice recognition service mainly used by the user. The scenario related to the keyword refers to a process of the service provided by the voice recognition apparatus 100 after the voice command is input.

Referring to FIG. 1, in various exemplary embodiments, the voice command database 130 may be stored in the voice recognition apparatus 100 and may be implemented as one module together with the receiver 110, the controller 120, and the provider 140.

The provider 140 outputs the guidance message and provides the service related to the keyword.

For instance, the provider 140 may output a guidance message 'Say your command' according to a user's voice utterance or a user's button input.

In addition, the provider 140 receives the user's command and executes an application service including an application related to the keyword included in the voice command. When the keyword is "phone", the provider 140 may execute a phone connection application mapped to the keyword "phone".

When the user's touch input is detected during the output of the voice recognition service related to the voice command of the user, the provider 140 may stop providing the service that is extracted from the voice command of the user.

For example, when the provider 140 outputs a guidance message, "Please say who you are calling" according to the keyword "phone", the user may touch a display to provide a name of a user's opponent or utter a name of a user's opponent. In the present case, the providing device 140 stops outputting the guidance message, and the controller 120 receives the user's second command through the receiving device 110.

Referring to FIG. 2, in various exemplary embodiments, the voice command database 130 may be stored in an external device separate from the voice recognition apparatus 100. At the present time, the voice recognition apparatus 100 provides a voice recognition service in cooperation with an external apparatus in which the voice command database 130 is stored through a communication network.

For instance, in various exemplary embodiments, the external device may refer to another storage medium included in the vehicle. When the voice recognition apparatus 100 is provided in the vehicle, the voice command database 130 may be provided in a memory included in the vehicle. At the present time, the voice recognition apparatus 100 may receive various data stored in the voice command database 130 through an internal-vehicle network including a Control Area Network (CAN). A detailed description related thereto will be described later with reference to the drawings.

Figure 3:
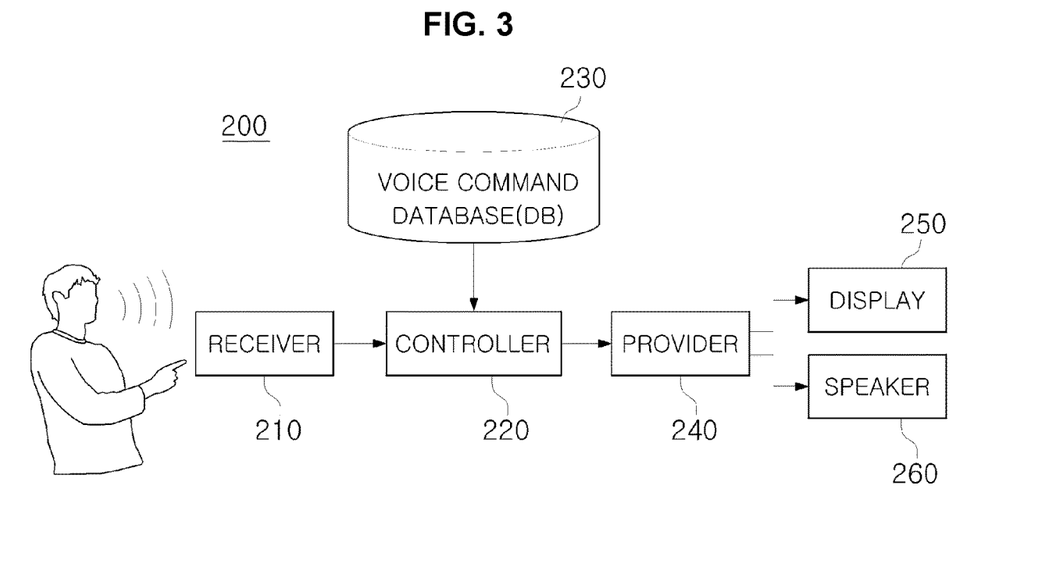
FIG. 3 and FIG. 4 are diagrams illustrating a control block diagram of a vehicle in which a voice recognition apparatus according to another exemplary embodiment is incorporated.
Figure 4:
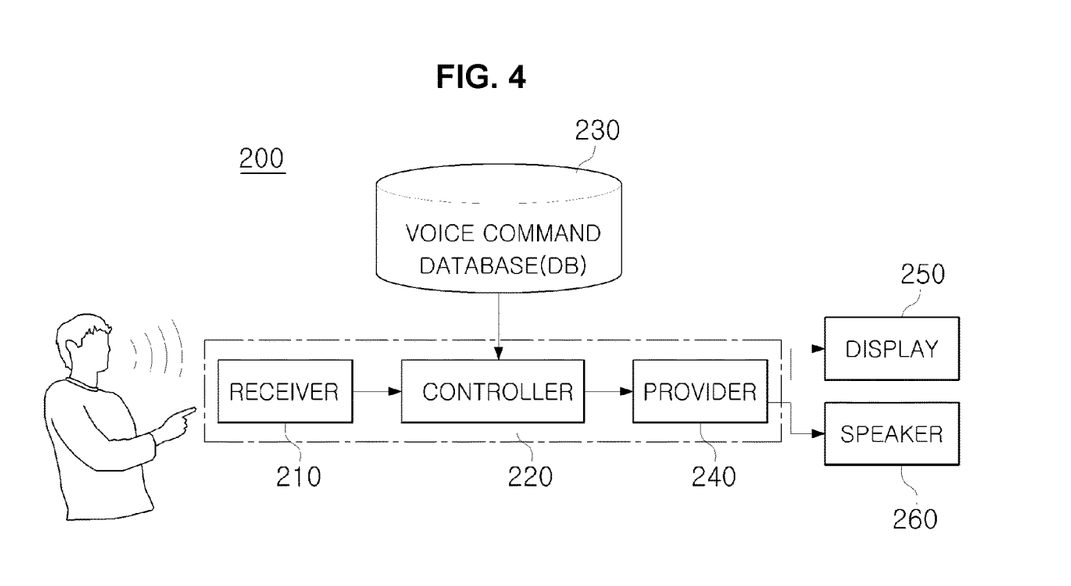

FIG. 3 and FIG. 4 are diagrams illustrating a control block diagram of a vehicle in which a voice recognition apparatus according to another exemplary embodiment is incorporated. To avoid redundant description, the following description will be made.

According to another exemplary embodiment, a voice recognition apparatus 200 shown in FIG. 3 and FIG. 4 may be provided together with an Audio Video Navigation (AVN) terminal built in the vehicle. The AVN terminal described below refers to a device configured for integrally performing audio, video, and navigation functions.

A receiver 210 shown in FIG. 3 and FIG. 4 receives a voice command of a user through a voice recognition detector and receives a touch input of a user which is detected on a display 250 of the AVN terminal through a touch detector. In addition, the receiver 210 may receive a command input by a user through a controller provided in a jog shuttle type or a hard key type disposed in the vehicle.

A controller 220 and a provider 240 shown in FIG. 3 and FIG. 4 have the same processes as those performed by the controller 120 and the provider 140 of FIG. 1 and FIG. 2, thus details thereof will be omitted.

The voice recognition apparatus 200 disposed in the vehicle is configured to analyzes a user's listening pattern while outputting a voice recognition service, for example, a voice guidance message, and adjusts an output of the voice guidance message based on the analysis result.

Referring to FIG. 3, in various exemplary embodiments, a voice command database 230 may be stored in the voice recognition apparatus 200 and may be implemented as one module together with the receiver 210, the controller 220, and the provider 240.

In another exemplary embodiment, referring to FIG. 4, the voice command database 230 may be stored in an external device separate from the voice recognition apparatus 200.

In detail, when the voice recognition apparatus 200 is provided in the AVN terminal, the voice command database 230 may be included in a memory provided in the AVN terminal. In the present case, the memory provided in the AVN terminal may store data including a user history of listening, a user history of use of the voice recognition service, and a scenario according to keywords, and may provide the listening history which is required for the voice recognition apparatus 200 to analyze a listening pattern of the user.

Details related to the display 250 and a speaker 260 that are connected to the provider 240 to output a guidance message will be described later with reference to the drawings.

Figure 5:
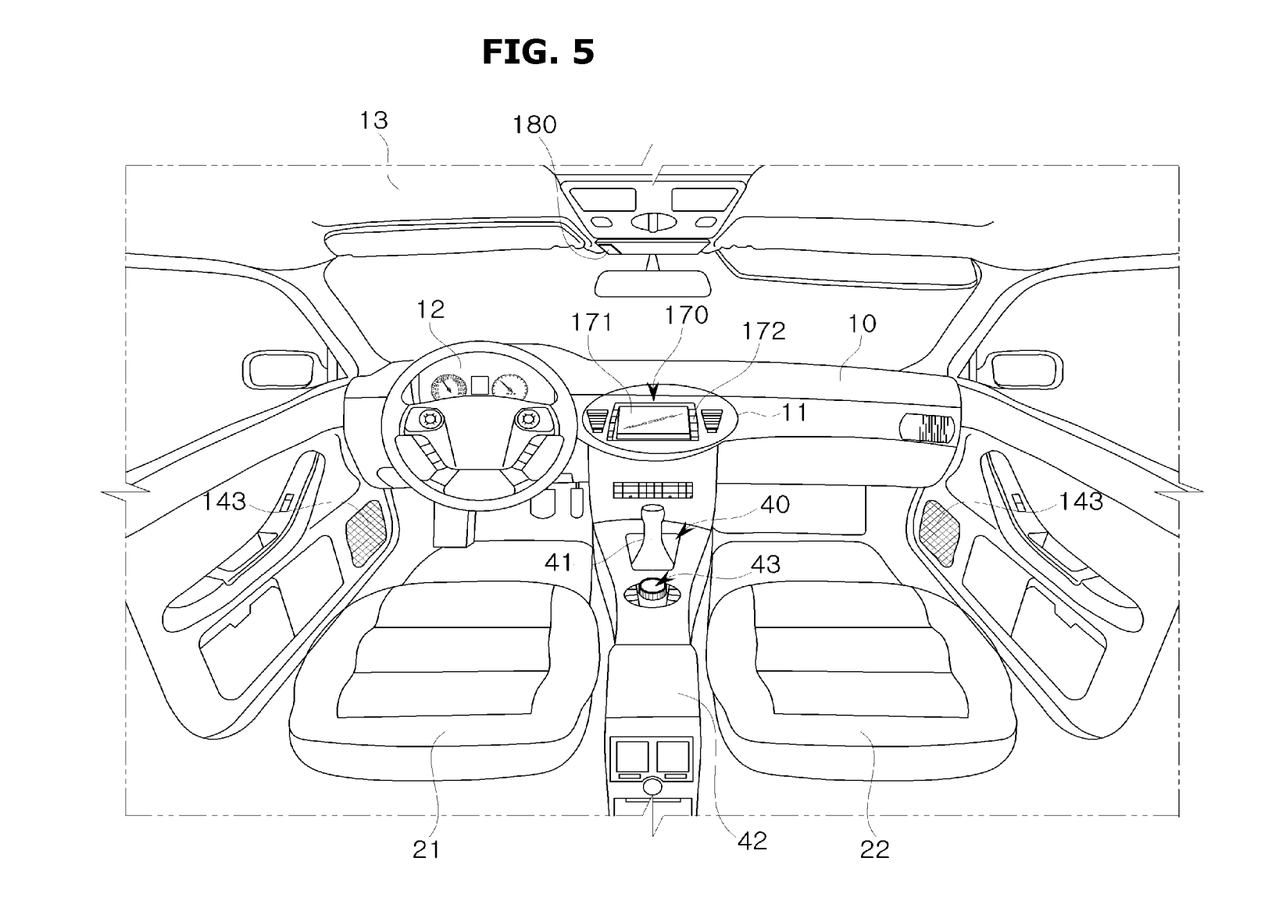
FIG. 5 is a diagram illustrating an internal configuration of a vehicle in which a voice recognition apparatus according to another exemplary embodiment of the present invention is incorporated.

FIG. 5 is a diagram illustrating an internal configuration of a vehicle in which a voice recognition apparatus is incorporated according to another exemplary embodiment.

As described above, in various exemplary embodiments, the voice recognition apparatus 200 may correspond to the AVN terminal 170 disposed in the vehicle. The AVN terminal 170 is a device configured for integrally performing audio, video, and navigation functions. The AVN terminal 170 may selectively display at least one of an audio screen, a video screen, and a navigation screen through an AVN display 171, and may display various control screens related to a vehicle control or a screen related to an additional function that may be executed in the AVN terminal 170 through an AVN display 171.

Referring to FIG. 5, the AVN display 171 is located in a center fascia 11, which is a central area of a dashboard 10. According to one example, the AVN display 171 is implemented as a liquid crystal display (LCD), a light emitting diode (LED), a plasma display panel (PDP), an organic light emitting diode (OLED), or a cathode ray tube (CRT).

In addition, an AVN input device 172 is located in the center fascia 11, which is a central area of the dashboard 10. A driver may input a command for controlling the AVN terminal 170 by operating the AVN input device 172.

Referring to FIG. 5, in various exemplary embodiments, the AVN input device 172 may be provided in a hard key type in an area adjacent to the AVN display 171. Further, when the AVN display 171 is implemented as a touch screen type, the AVN display 171 may also serve as the AVN input device 172.

A center console 40 is provided with a center input device 43 in a jog shuttle type or a hard key type. The center console 40 refers to a portion disposed between a driver's seat 21 and a front passenger's seat 22 in which a gear operating lever 41 and a tray 42 are formed. The center input device 43 may perform all or some of the functions of the AVN input device 172.

The voice input device 180 receives a voice command uttered by a driver through a microphone and converts the voice command into an electrical signal. In various exemplary embodiments, the voice input device 180 may be mounted to a head lining 13 as shown in FIG. 5 for the effective voice input, but the embodiment of the vehicle is not necessarily limited thereto. For instance, the voice input device 180 may be mounted on the dashboard 10, or on a steering wheel 12 in other embodiments. That is, the voice input device 180 is not limited to a predetermined position as long as it is positioned in a suitable region for receiving a voice of a driver while in driving.

The receiver 210 shown in FIG. 3 and FIG. 4 the voice input through the voice input device 180 as well as the touch input through the AVN display 171. In various exemplary embodiments, the receiver 210 may also receive a control command input by the driver operating the AVN input device 172 and the center input device 43.

The receiver 210, the display 250, and the speaker 260 shown in FIG. 3 and FIG. 4 correspond to the voice input device 180, the AVN display 171, and the internal-vehicle speaker 143 provided in the vehicle of FIG. 5.

Referring again to FIG. 5, the speaker 143 configured for outputting sound is disposed inside the vehicle. Accordingly, the vehicle outputs the sound needed for performing the audio function, the video function, the navigation function, and other additional functions through the speaker 143.

When receiving the voice command of the driver, the AVN terminal 170 may extract the keyword from the voice command of the driver using the voice command database 230. The voice recognition apparatus 200 executes a service associated with the keyword. According to one embodiment, when the keyword extracted from the driver by use of the voice command database 230 corresponds to "destination search", the voice recognition apparatus 200 may execute the navigation application.

Thereafter, the voice recognition apparatus 200 outputs a guidance message asking the driver information about a destination, so that a driver easily reaches a desired destination. In addition, the AVN terminal 170 may receive the information about the destination through the AVN display 171, or receives the information about the destination through the voice input device 180.

The AVN terminal 170 receives a touch input of the driver while searching for a service related to the keyword extracted from the voice command of the driver. At the present time, the AVN terminal 170 may stop searching for a service related to the keyword from the voice command database 230.

The AVN terminal 170 searches a service related to a category indicated in an area where the touch input of the driver is detected using the voice command database. Accordingly, in various exemplary embodiments, the AVN terminal 170 may display services related to the category in descending order of the usage frequency on the AVN display 171 on the AVN display 171, or deliver the services related to the category to the driver through the speaker 143 in descending order of the usage frequency on the AVN display 171.

Figure 6:
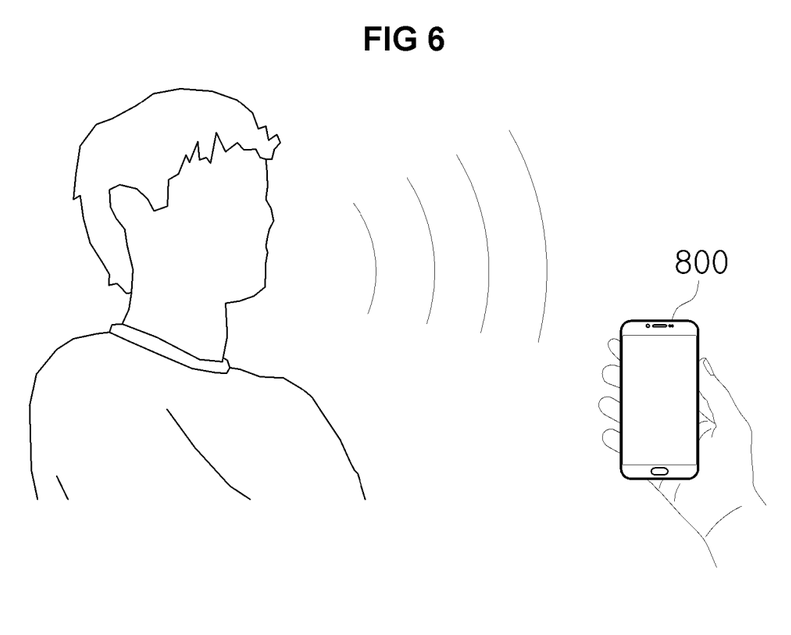
FIG. 6 is a diagram illustrating a case where a voice recognition service is provided to a user through a vehicle and a portable terminal each having a voice recognition device according to an exemplary embodiment of the present invention.

FIG. 6 is a diagram illustrating an exemplary embodiment where a voice recognition service is provided to a user through a vehicle and a portable terminal each having a voice recognition device according to an embodiment.

Referring to FIG. 6, the voice recognition apparatus 100 is embedded in a portable terminal 800. A user may transmit a touch input by touching the display of the portable terminal 800, or may transmit a voice command through a microphone disposed in the portable terminal 800.

When at least one of the user's touch input and the voice command is received, the voice recognition apparatus 100 searches for a service desired by a user by use of the voice command database 130, in which data related to a frequency of a user using the voice recognition service is organized, and provides the user with the determined service.

As another example, the portable terminal 800 may receive a search result related to a service desired by a user in cooperation with a voice database stored in an external device through a communication network including the Internet, and may provide a service based on the received search result.

The voice recognition apparatus provided in the portable terminal 800 also stores the user's listening history and analyze the listening pattern based on the listening history. Thereafter, the voice recognition apparatus 100 adjusts the provided guidance message and enhance the interaction with the user. The description related to the present operation will be described later in detail based on the following flowcharts.

Figure 7:
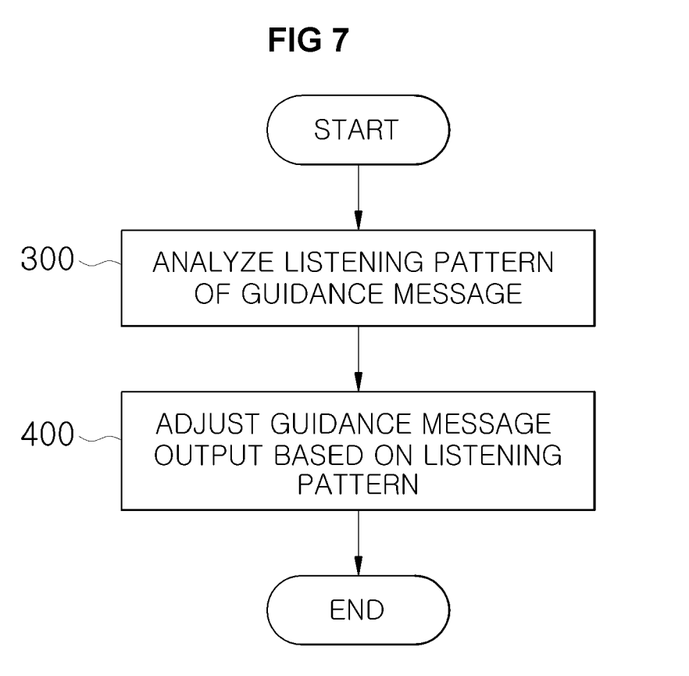
FIG. 7 is a flowchart showing a method of controlling a voice recognition apparatus according to an exemplary embodiment of the present invention.

FIG. 7 is a flowchart illustrating a method of controlling a voice recognition apparatus according to an exemplary embodiment of the present invention.

Referring to FIG. 7, the disclosed voice recognition apparatus 100 analyzes a pattern in which a user listens to a guidance message (300).

Here, the listening pattern refers to an average listening time that the users normally listen to the guidance message. As described above, the voice recognition apparatus 100 outputs a guidance message according to a scenario stored in advance. The user may fully recognize the contents of the guidance message which is repeatedly outputted and may speak the next voice input command without listening to all the contents of the guidance message.

The voice recognition apparatus 100 adjusts an output of a next guidance message in accordance with the user's listening pattern (400).

The example of adjusting the output of the guidance message may vary. For instance, in various exemplary embodiments, when the user's listening time is very short, the voice recognition apparatus 100 may output only a short beep sound without providing an output of a guidance message. Further, when the listening time is relatively long, it is possible to output a short-length message other than the guidance message output in a normal scenario, or output the guidance message at a higher output speed.

Figure 8:
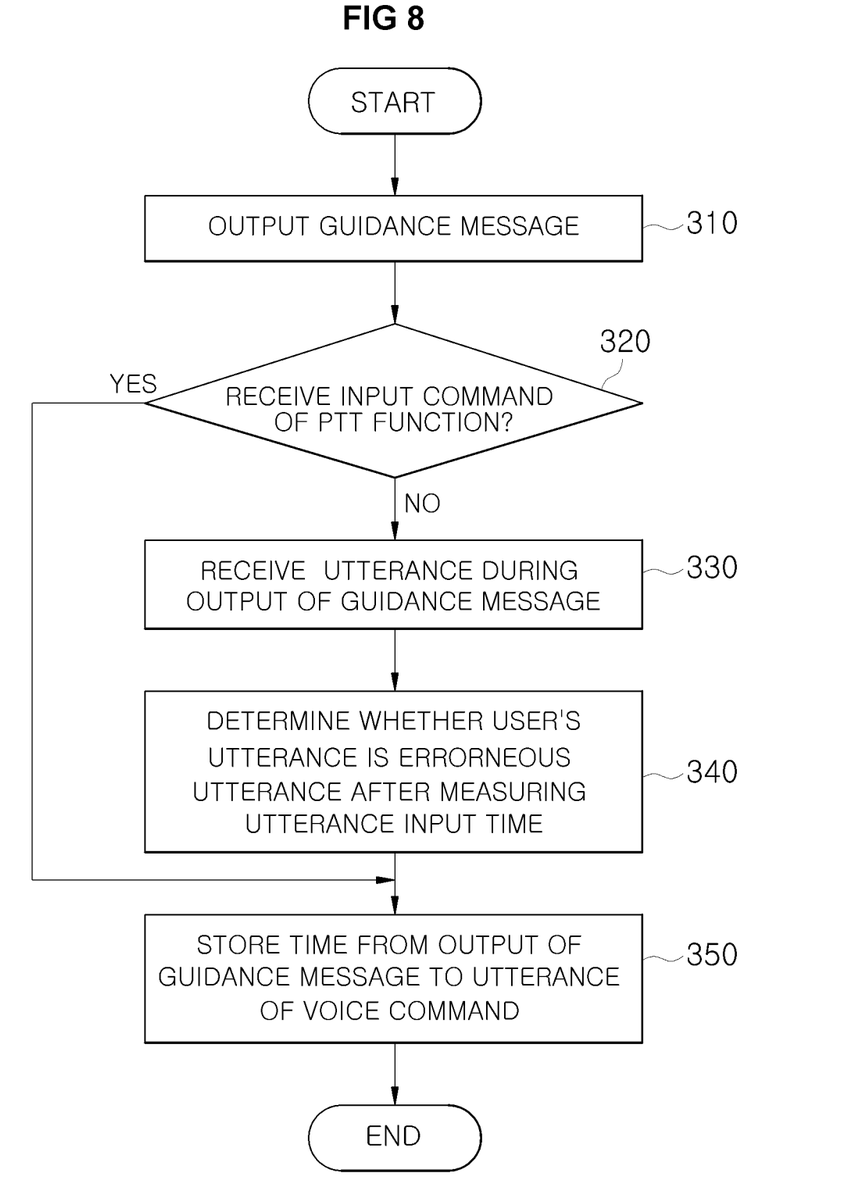
FIG. 8 is a flowchart showing an example of analyzing a listening pattern.
Figure 9:
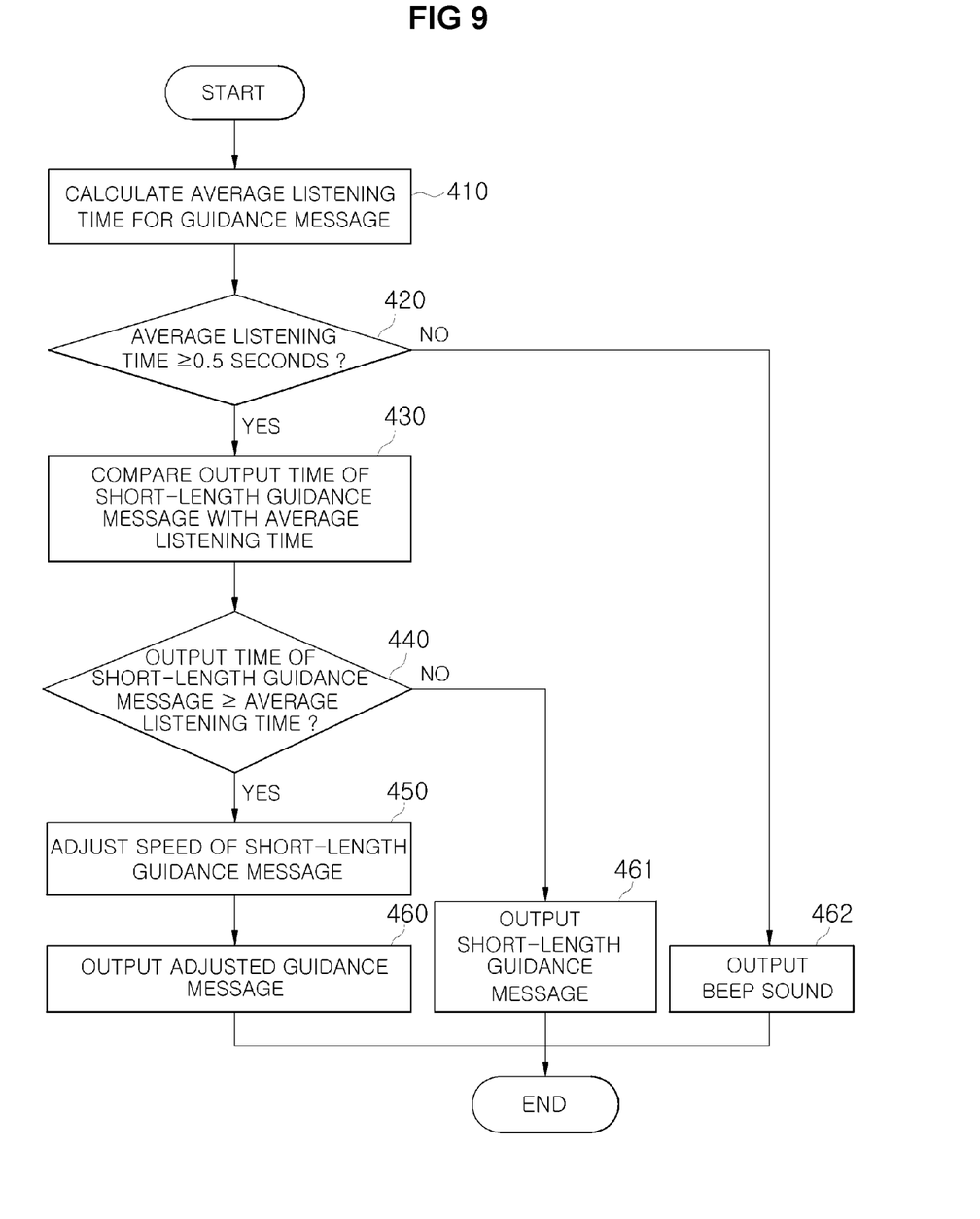
FIG. 9 is a flowchart showing an example of adjusting a guidance message according to the analysis result of the listening pattern.

Referring to FIG. 8 and FIG. 9, the control method described with reference to FIG. 7 will be described.

FIG. 8 is a flowchart showing an example of analyzing a listening pattern.

Referring to FIG. 8, the voice recognition apparatus 100 outputs a guidance message (310).

For example, the receiver 110 receives an operation start command from a user. The receiver 110 converts the received command into an electrical signal, and transmits the electrical signal to the controller 120.

The controller 120 outputs a guidance message according to a scenario stored in the voice command database 130 based on the received signal.

The guidance message corresponds to various prompts outputted by the voice recognition apparatus 100. Here, the prompt refers to an interface for indicating that a general computer device is waiting for a user's input.

The voice recognition apparatus 100 outputs a signal indicating that a user's command is being awaited together with a guidance message by changing a display form of a screen. A specific example related to the present operation will be described with reference to FIG. 10.

While outputting the guidance message, the receiver 110 receives an input command of a Push to Talk (PTT) function (320).

Here, the PTT function refers to a function of transmitting a sound to a user or the other party only when a specific button is pressed. For example, in various exemplary embodiments, the voice recognition apparatus 100 may include an input button for confirming that the user is waiting for a voice input while outputting a guidance message, as an example of the above-mentioned prompt. That is, the user a button corresponding to the PTT function or input a touch to input a desired voice command while a guidance message is being output.

When the voice recognition apparatus 100 receives a PTT input command, the outputting of the guidance message is stopped, and a listening time from the outputting of the guidance message to the receiving of the PTT input command is stored (350).

The stored listening time is used to analyze a listening pattern. In various exemplary embodiments, the listening time may be stored in the voice command database 130, or stored outside via communication.

When the voice recognition apparatus 100 does not receive an input command corresponding to the PTT function or does not output such a function, the voice recognition apparatus 100 receives a new voice utterance of the user during the output of the guidance message (330).

Here, the user's utterance refers to a new voice command vocalized by the user. In addition, a user's utterance during output of a guidance message is a barged-in voice that the user, who is familiar with the repeatedly output guidance message, vocalizes without waiting for the completion of the output of the guidance message.

Thereafter, the voice recognition apparatus 100 according to an exemplary embodiment determines whether the user's utterance is a new voice command (340).

In various exemplary embodiments, the receiver 110 may receive various sounds in addition to the voice command of the user while the guidance message is being played. The controller 120 determines whether the user's utterance among the received sound is a new voice command or an erroneous utterance.

For example, when the voice recognition apparatus 100 receives an utterance input within a predetermined time after output of a guidance message, the voice recognition apparatus 100 may determine the utterance to be an erroneous utterance. That is, a user's voice input within a significantly short time after output of a guidance message is not determined to be a new voice command.

The method of determining an erroneous utterance is not limited to the aforementioned example. As another example, the voice recognition apparatus 100 compares a keyword stored in the voice command database 130 with a voice command to determine whether the voice is an erroneous utterance or not.

When the voice of the user is recognized as a new voice command without being determined to be an erroneous utterance, the voice recognition apparatus 100 measures a time period from when the outputting of the guidance message is started to when the utterance of the voice command is started, and stores the measured time as a listening time (350).

The stored listening time is used as data for analyzing a listening pattern of a next user listening a guidance message. That is, the voice recognition apparatus 100 stores listening times of users and determines the average listening time.

The determined listening pattern is used to adjust an output of a next guidance message. An example of adjusting the guidance message is described below with reference to FIG. 9.

FIG. 9 is a flowchart showing an example of adjusting a guidance message according to the analysis result of the listening pattern.

Referring to FIG. 9, the voice recognition apparatus 100 determines an average of the listening times for a guidance message (410).

As described in FIG. 8, the average listening time refers to a listening time that a user instructs an input command having a PTT function or utters a new voice command during output of a guidance message.

The voice recognition apparatus 100 determines whether the average listening time is greater than or equal to 0.5 seconds (420). Here, 0.5 seconds is a predetermined time. The predetermined time may be variously set as long as a user utters a new voice command or instructs a PTT input command while a guidance message is rarely output.

For example, when a guidance message is "Yes, say your command", 0.5 second is an insufficient time to output "Yes".

In various exemplary embodiments, when it is determined as a result of operation 420, that the user's listening time is shorter than 0.5 seconds, the voice recognition apparatus 100 may output a simple beep sound (462).

The beep sound is a simple sound that indicates the state of the apparatus to the user. The voice recognition apparatus 100 according to an exemplary embodiment outputs only a simple sound instead of outputting guidance message when the average listening time of the user is significantly short.

When the listening time is 0.5 seconds or greater, the voice recognition apparatus 100 compare an output time of a short-length guidance message, which replaces the guidance message stored in the scenario, with the average listening time (430).

Here, the short-length guidance message (a second guidance message) refers to a preliminary prompt of the guidance message (a first guidance message) output by the scenario. In various exemplary embodiments, when the first guidance message is "Yes, say your command", the second guidance message may be "Yes, your command". That is, the second guidance message includes a preliminary guidance message that may be output during a shortened listening time and be recognized by the user.

Then, the voice recognition apparatus 100 compares the output time of the second guidance message with the average listening time (440).

When the output time of the short-length guidance message (second guidance message) is shorter than the average listening time, the voice recognition apparatus 100 outputs the second guidance message (461).

In various exemplary embodiments, when the output time of the second guidance message is shorter than the average listening time, the guidance message may be output during the listening time of the user, and further, by helping the user to secure time for listening to the contents, the interaction with the user is enhanced.

When the output time of the second guidance message is greater than or equal to the average listening time, the voice recognition apparatus 100 adjusts the speed of the second guidance message (450).

The output time of the second guidance message being greater than or equal to the average listening time represents that the user does not sufficiently receive the second guidance message during the listening time. In the present case, the voice recognition apparatus 100 may increase the tempo of the second guidance message "Yes, your command" to increase the speed of the voice to be output.

Thereafter, the voice recognition apparatus 100 outputs the adjusted second guidance message (460).

The example of adjusting the output of the guidance message is not limited to adjusting the output speed, but includes various adjustments that the user may perceive. In various exemplary embodiments, the voice recognition apparatus 100 may output a beep sound while outputting the adjusted second guidance message. The control method of the voice recognition apparatus 100 may be variously modified by combining operations 460 to 462.

Figure 10:
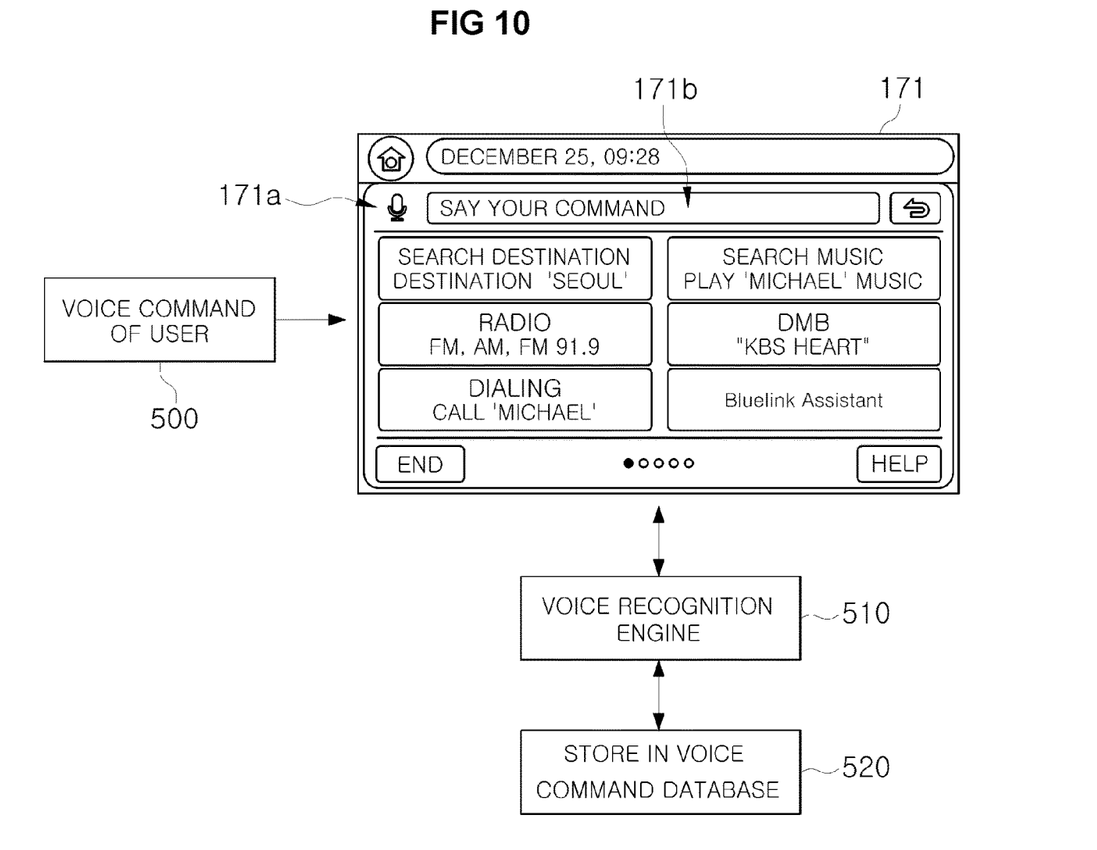
FIG. 10 is a diagram illustrating a method of providing a service in which a voice recognition apparatus included in an AVN terminal of a vehicle outputs a guidance message.

FIG. 10 is a diagram illustrating a method of providing a service in which a voice recognition apparatus included in an AVN terminal of a vehicle outputs a guidance message.

In various exemplary embodiments, the voice recognition apparatus 100 may be provided together with the AVN terminal of the vehicle, and may provide a voice recognition service corresponding to a voice command to the AVN display 171 as shown in FIG. 10. Referring to FIG. 10, the voice recognition service according to an exemplary embodiment of the present invention includes application services including "search destination", "search music", "Radio", "DMB", "dialing", and "Blue link Assistant".

In various exemplary embodiments, the user instructs the voice recognition apparatus 100 to operate by use of a voice command or a button of the AVN input device 172. The voice recognition apparatus 100 receiving the above command may output a guidance message 171b "say your command" while outputting a prompt screen as shown in FIG. 10.

The user selects the above-mentioned various application services through a voice according to the guidance of the guidance message 171b, and the voice recognition apparatus 100 receives the voice command (500).

The voice recognition apparatus 100 receives the voice command activates the voice recognition engine to extract a keyword in the voice command (510). When the voice recognition apparatus 100 extracts a keyword "telephone", the voice recognition apparatus 100 executes the "dialing" application service.

In various exemplary embodiments, as a user fully understands the guidance message 171b due to the repeated use of the AVN terminal 170, the user may directly input a voice command without waiting for the completion of the output of the guidance message 171b. In addition, while the guidance message 171b is being output, the user may touch the input button 171a having the PTT function.

In the present case, the voice recognition apparatus 100 stops outputting the guidance message.

The voice recognition apparatus 100 measures the listening time of the user's guidance message and stores the listening time in the voice command database 130 (520).

The voice recognition apparatus 100 determines the average listening time for the guidance message based on the previously stored previous listening time and the current listening time.

In various exemplary embodiments, when the determined listening time is shorter than the output time of the guidance message 171b, the voice recognition apparatus 100 increases the output speed of the guidance message for the guidance messages to be adjusted and output at the listening time.

In another exemplary embodiment, when the user's listening time is significantly short, the voice recognition apparatus 100 may output only a beep sound to inform the user that the user is ready to receive a voice command.

The voice recognition apparatus, the vehicle including the voice recognition apparatus, and the control method of the voice recognition apparatus included in the above can allow the user to conveniently use voice recognition by modifying the guidance message such that the user is provided with a guidance message having a length more suitable to the user, and can enhance the interaction by providing a flexible output based on the user's behavior.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible 1 in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A voice recognition apparatus comprising;
 a receiver configured to receive a voice command;
 a provider configured to output a guidance message; and
 a controller configured to control the provider in response to the voice command, analyze a listening pattern of the guidance message transmitted by the receiver, and control an output of the guidance message based on the listening pattern,
 wherein the listening pattern includes listening times from when the outputting of the guidance message is started to when the outputting of the guidance message is stopped by a user's input, and
 wherein the controller compares the listening times with a predetermined time, and determines a short-length guidance message based on a result of comparing the listening times with the predetermined time,
 wherein when the listening times are equal to or greater than the redetermined time, the controller is configured to output the determined short-length guidance message shorter than the guidance message in length, and wherein the controller compares the determined short-length guidance message with the listening times and controls an output seed of the determined short-length guidance message based on a result of comparing the determined short-length guidance message with the listening times.

2. The voice recognition apparatus according to claim 1, wherein
the listening pattern includes an average of the listening times for the guidance message.

3. The voice recognition apparatus according to claim 1, wherein
when the listening pattern is shorter than the predetermined time, the controller is configured to control the provider to output a beep sound without outputting the guidance message.

4. The voice recognition apparatus according to claim 1, wherein
when the controller receives a new voice command from the user while the guidance message is being output, the controller is configured to stop outputting the guidance message.

5. The voice recognition apparatus according to claim 1, further including a voice command database configured to store the listening times, wherein the controller is configured to control the output of the guidance message based on an average of the listening times stored in the voice command database.

6. A vehicle comprising:
a receiver configured to receive a voice command;
an Audio Video Navigation (AVN) terminal configured to output a service including a guidance message; and
a controller configured to control the AVN terminal in response to the voice command, analyze a listening pattern for the guidance message transmitted by the receiver, and control an output of the guidance message based on the listening pattern,
wherein the listening pattern includes listening times from when the outputting of the guidance message is started to when the outputting of the guidance message is stopped by a user's input, and
wherein the controller compares listening times with a predetermined time, and determines a short-length guidance message based on a result of comparing the listening times with the predetermined time,
wherein when the listening times are equal to or greater than the predetermined time, the controller is configured to output the determined short-length guidance message shorter than the guidance message in length, and
wherein the controller compares the determined short-length guidance message with the listening times and then controls an output speed of the determined short-length guidance message based on a result of comparing the determined short-length guidance message with the listening times.

7. The vehicle according to claim 6, wherein the listening pattern includes an average of the listening times for the guidance message.

8. The vehicle according to claim 6, wherein, when the listening pattern is shorter than the predetermined time, the controller is configured to output a beep sound without outputting the guidance message.

9. The vehicle according to claim 6, wherein the AVN terminal further includes a display configured to recognize the user's touch, and
upon receiving the user's touch during the output of the guidance message, the controller is configured to stop outputting the guidance message.

10. The vehicle according to claim 6, further including a voice command database configured to store the listening pattern, wherein the controller is configured to control the output of the guidance message based on an average of the listening times stored in the voice command database.

11. A control method of a voice recognition apparatus, the control method comprising:
receiving at least one of a user's input and a voice command;
outputting, by a controller, a guidance message corresponding to the at least one of the user's input and the voice command;
analyzing, by the controller, a listening pattern for the guidance message; and
adjusting, by the controller, an output of the guidance message based on the listening pattern,
wherein the listening pattern includes listening times from when the outputting of the guidance message is started to when the outputting of the guidance message is stopped by the user's input,
wherein the analyzing includes comparing the listening times with a predetermined time and the adjusting includes determining a short-length guidance message based on a result of comparing the listening times with the predetermined time,
wherein the outputting of the guide message includes determining of the short-length guidance message shorter than the guidance message in length, when the listening times re equal to or greater than the predetermined time, and
wherein the analyzing further includes comparing the determined short-length guidance message with the listening times and the adjusting further includes controlling of output speed of the determined short-length guidance message based on a result of comparing the determined short-length guidance message with the listening times.

12. The method according to claim 11, wherein the outputting includes stopping the output of the guidance message according to the user's input after the guidance message is output.

13. The method according to claim 11, wherein the outputting includes stopping the output of the guidance message when the voice command is received while the guidance message is being output.

14. The voice recognition method according to claim 12, wherein the outputting of the guidance message includes continuously outputting the guidance message when an input time of the voice command is shorter than the predetermined time.

15. The voice recognition method according to claim 11, wherein the outputting of the guidance message includes outputting the controlled guidance message, when the at least one of the user's input and the voice command is received again.

* * * * *